(12) United States Patent
Merritt et al.

(10) Patent No.: US 7,232,521 B2
(45) Date of Patent: Jun. 19, 2007

(54) ENVIRONMENTALLY FRIENDLY ACID NEUTRALIZING CARTRIDGE

(75) Inventors: Steven J. Merritt, Kearney, NE (US); Gene W. Brown, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 51 days.

(21) Appl. No.: 10/457,239

(22) Filed: Jun. 9, 2003

(65) Prior Publication Data

US 2004/0140255 A1 Jul. 22, 2004

Related U.S. Application Data

(60) Provisional application No. 60/387,197, filed on Jun. 7, 2002, and provisional application No. 60/387,235, filed on Jun. 7, 2002.

(51) Int. Cl.
| | |
|---|---|
| *B01D 27/00* | (2006.01) |
| *B01D 27/08* | (2006.01) |
| *B01D 35/00* | (2006.01) |
| *F01M 1/00* | (2006.01) |
| *C10M 125/10* | (2006.01) |

(52) U.S. Cl. .................. 210/206; 210/232; 210/209; 210/501; 210/450; 123/196 A; 184/6.24

(58) Field of Classification Search ............... 210/206, 210/209, 232, 168, 501, 450; 123/196 A; 184/6.24

See application file for complete search history.

(56) References Cited

U.S. PATENT DOCUMENTS

| | | |
|---|---|---|
| 1,914,999 A | 6/1933 | Maverick et al. |
| 2,196,821 A | 4/1940 | Arnold |
| 2,262,526 A * | 11/1941 | Fairlie et al. ............... 210/168 |
| 2,411,539 A | 11/1946 | Gunn |
| 2,537,992 A | 1/1951 | Gross et al. |
| 2,601,404 A | 6/1952 | Lasky |
| 2,843,268 A | 7/1958 | Kennedy |
| 2,942,572 A | 6/1960 | Pall |
| 3,005,555 A | 10/1961 | Bosworth |
| 3,056,499 A | 10/1962 | Emond |
| 3,529,719 A | 9/1970 | Graybill |
| 4,075,097 A | 2/1978 | Paul |
| 4,075,098 A | 2/1978 | Paul et al. |

(Continued)

FOREIGN PATENT DOCUMENTS

| | | |
|---|---|---|
| EP | 0287527 A2 | 10/1988 |
| GB | 504064 | 6/1939 |
| GB | 836993 | 6/1960 |
| WO | WO 86/03687 A1 | 7/1986 |
| WO | WO 02/092193 A1 | 11/2002 |

*Primary Examiner*—Thomas M. Lithgow
(74) *Attorney, Agent, or Firm*—Leydig, Voit & Mayer, Ltd.

(57) ABSTRACT

An environmentally friendly acid neutralizing filter cartridge for mounting into a chamber of a cartridge mounting body for neutralizing acid in engine oil in an oil circulation circuit of an engine. The environmentally friendly acid neutralizing filter cartridge comprises a support housing comprising substantially no metal parts such that the environmentally friendly acid neutralizing filter cartridge can be readily incinerated. The support housing comprises at least one inlet port and at least one outlet port. A bed of acid neutralizing particles is contained in the support housing between the inlet port and the outlet port. Means is provided for preventing acid neutralizing particles from flowing through the at least one outlet port. An annular seal is arranged externally on the support housing and separates the at least one inlet port and the at least one outlet port to prevent oil from short circuiting the bed of acid neutralizing particles.

31 Claims, 9 Drawing Sheets

U.S. PATENT DOCUMENTS

| | | | | |
|---|---|---|---|---|
| 4,324,660 | A | 4/1982 | Peyton et al. | |
| 4,336,042 | A | 6/1982 | Frantz et al. | |
| 4,501,660 | A | 2/1985 | Hebert | |
| 4,557,829 | A | 12/1985 | Fields | |
| 4,655,914 | A | 4/1987 | Wada | |
| 4,733,449 | A | 3/1988 | Spearman | |
| 4,751,901 | A | 6/1988 | Moor | |
| 4,802,979 | A | 2/1989 | Medley, III | |
| 4,832,836 | A | 5/1989 | Selsdon | |
| 4,872,976 | A | 10/1989 | Cudaback | |
| 4,906,389 | A | 3/1990 | Brownawell et al. | |
| 4,946,485 | A | 8/1990 | Larsson | |
| 5,042,617 | A | 8/1991 | Brownawell et al. | |
| 5,049,269 | A | 9/1991 | Shah | |
| 5,068,044 | A | 11/1991 | Brownawell et al. | |
| 5,069,799 | A | 12/1991 | Brownawell et al. | |
| 5,078,877 | A | 1/1992 | Cudaback et al. | |
| 5,089,131 | A | 2/1992 | Gentry | |
| 5,112,482 | A | 5/1992 | Shaub et al. | |
| 5,180,490 | A | 1/1993 | Eihusen et al. | |
| 5,225,081 | A | 7/1993 | Brownawell | |
| 5,234,585 | A | 8/1993 | Zuk | |
| 5,236,579 | A | 8/1993 | Janik et al. | |
| 5,236,595 | A | 8/1993 | Wang et al. | |
| 5,342,511 | A | 8/1994 | Brown et al. | |
| 5,447,627 | A | 9/1995 | Loafman et al. | |
| 5,459,074 | A | 10/1995 | Muoni | |
| 5,490,930 | A | 2/1996 | Krull | |
| 5,525,226 | A | 6/1996 | Brown et al. | |
| 5,527,452 | A | 6/1996 | Grigoriev et al. | |
| 5,527,463 | A | 6/1996 | Morgan | |
| 5,538,542 | A | 7/1996 | Watanabe et al. | |
| 5,538,543 | A | 7/1996 | Watanabe et al. | |
| 5,562,746 | A | 10/1996 | Raether | |
| 5,622,544 | A | 4/1997 | Shamine et al. | |
| 5,660,802 | A | 8/1997 | Archer et al. | |
| 5,685,985 | A | 11/1997 | Brown et al. | |
| 5,695,637 | A | 12/1997 | Jiang et al. | |
| 5,702,592 | A | 12/1997 | Suri et al. | |
| 5,702,602 | A * | 12/1997 | Brown et al. | 210/342 |
| 5,718,258 | A | 2/1998 | Lefebvre et al. | |
| 5,718,743 | A | 2/1998 | Donnelly et al. | |
| 5,738,785 | A | 4/1998 | Brown et al. | |
| 5,772,881 | A * | 6/1998 | Stockhowe et al. | 210/440 |
| 5,779,772 | A | 7/1998 | Unger et al. | |
| 5,792,245 | A | 8/1998 | Unger et al. | |
| 5,851,269 | A | 12/1998 | Strope | |
| 5,888,383 | A | 3/1999 | Cox | |
| 5,904,357 | A | 5/1999 | Demirdogen et al. | |
| 5,906,736 | A | 5/1999 | Bounnakhom et al. | |
| 5,996,810 | A | 12/1999 | Bounnakhom et al. | |
| 6,024,229 | A | 2/2000 | Ayers | |
| 6,045,693 | A | 4/2000 | Miller et al. | |
| 6,235,194 | B1 | 5/2001 | Jousset | |
| 6,322,697 | B1 | 11/2001 | Hacker et al. | |
| 6,478,958 | B1 | 11/2002 | Beard et al. | |
| 6,537,453 | B2 * | 3/2003 | Beard et al. | 210/206 |
| 6,555,000 | B2 | 4/2003 | Knight | |
| 2002/0043495 | A1 * | 4/2002 | Beard et al. | 210/416.1 |
| 2002/0185454 | A1 * | 12/2002 | Beard et al. | 210/749 |

\* cited by examiner

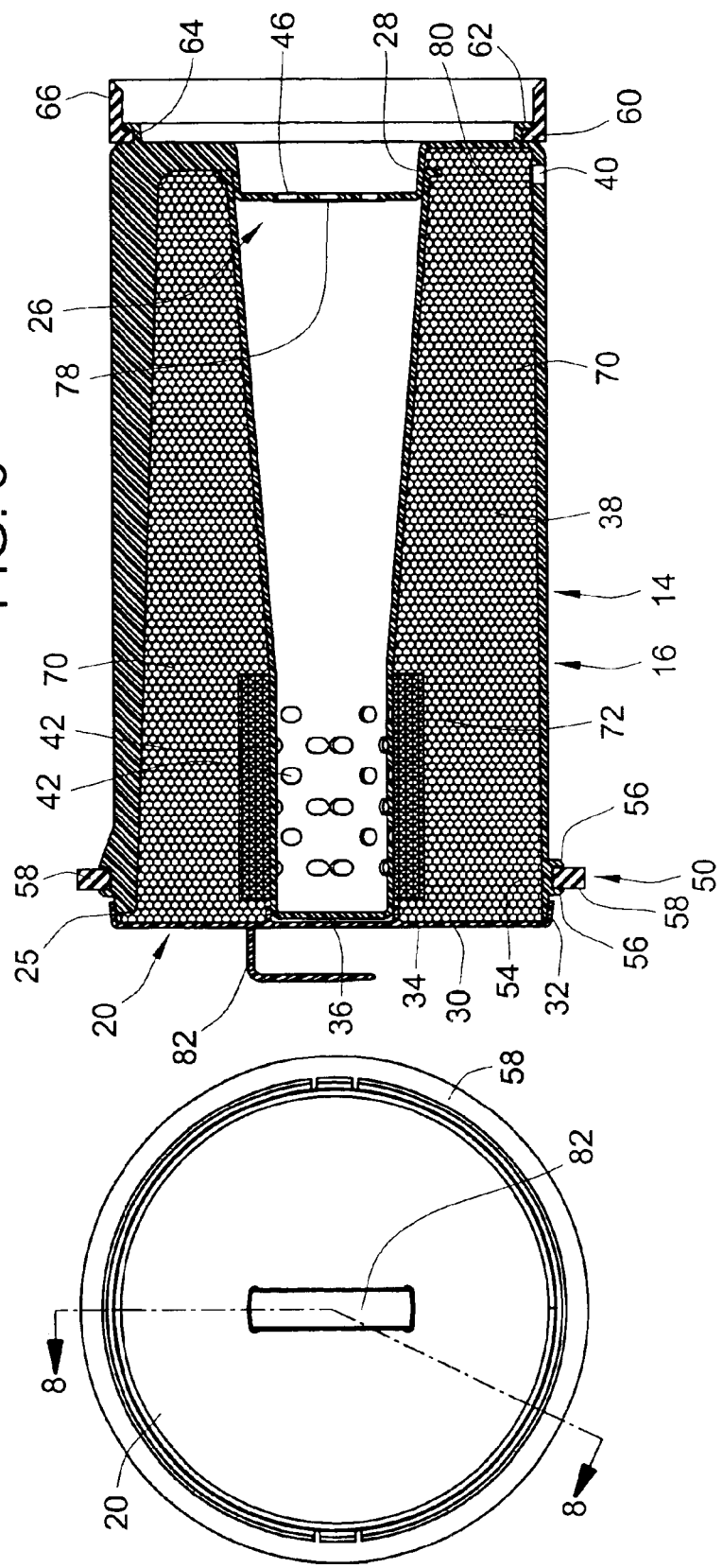

ENVIRONMENTALLY FRIENDLY ACID NEUTRALIZING CARTRIDGE

CROSS-REFERENCE TO RELATED PATENT APPLICATIONS

This patent application claims the benefit of U.S. Provisional Patent Application Nos. 60/387,197 and 60/387,235, both filed Jun. 7, 2002.

FIELD OF THE INVENTION

The present invention relates to a method and apparatus for neutralizing acid in fluid circulating systems. More particularly, the invention is directed toward an apparatus for removing acids from lubrication oil in oil circulating systems such as the oil systems associated with a diesel engine.

BACKGROUND OF THE INVENTION

Heavy duty diesel engine life, or time to rebuild, has historically been linked directly to piston ring, cylinder liner and/or crank shaft bearing life (referred to as "bearings" for sake of simplicity). Engine design parameters require that these engine components be lubricated, typically with a film lubricant of oil separating these engine components to prevent or minimize direct metal to metal contact. With oil lubricating these bearing surfaces, the principal mechanism associated with engine wear is not metal to metal contact or frictional wear. Instead the primary diesel engine wear component influencing engine life is corrosive wear caused by sulfur and nitrogen containing acids that are formed as products of combustion. One estimate is that more than 70% of heavy duty diesel engine wear is caused by such combustion acid metal corrosion.

Control of diesel engine corrosive wear has historically been accomplished through the inclusion of basic or alkaline chemicals dissolved or suspended in the engine oil that are used to rapidly neutralize combustion acid upon contact with the acid molecules. There have been proposals in the prior art to release alkaline or basic chemicals into the oil or otherwise neutralize acids utilizing a housing arranged along an oil circuit such as is disclosed in U.S. Pat. No. 5,459,074 to Muoni; U.S. Pat. No. 5,718,258 to Lefebvre et al.; U.S. Pat. No. 5,068,044 to Brownawell et al.; U.S. Pat. No. 5,069,799 to Brownawell et al.; U.S. Pat. No. 5,225,081 to Brownawell et al.

Any attempt at implementing acid neutralizing technology into a commercial practical engine oil circuit needs to accommodate several important factors while at the same time providing a sufficiently inexpensive filter cartridge for maintenance intervals to make it commercially practical for fleet managers and the like. As will be appreciated with an understanding of the present invention, these issues have not heretofore been adequately satisfied by the prior art.

BRIEF SUMMARY OF THE INVENTION

One aspect of the present invention is directed toward an environmentally friendly acid neutralizing filter cartridge for mounting into a chamber of a cartridge mounting body for neutralizing acid in engine oil in an oil circulation circuit of an engine. The environmentally friendly acid neutralizing filter cartridge comprises a support housing comprising substantially no metal parts such that the environmentally friendly acid neutralizing filter cartridge can be readily incinerated. The support housing comprises at least one inlet port and at least one outlet port. A bed of acid neutralizing particles is contained in the support housing between the inlet port and the outlet port. Means is provided for preventing acid neutralizing particles from flowing through the at least one outlet port. An annular seal is arranged externally on the support housing and separates the at least one inlet port and the at least one outlet port to prevent oil from short circuiting the bed of acid neutralizing particles.

Another aspect of the present invention is directed toward an environmentally friendly acid neutralizing bypass filter cartridge that is specially configured for a bypass circuit of an oil circulation circuit of an engine that provides for practical and economical implementation. The bypass oil circuit is arranged in a manner with flow being restricted such that the bypass oil circuit passes a substantially smaller amount of oil than that being circulated to the engine bearings. The oil circulation circuit includes a full flow particulate filter in series with the engine bearings. The bypass filter cartridge a support housing adapted to being mounting in the cartridge mounting body along the bypass circuit. The support housing comprises substantially no metal parts such that the support housing can be more easily incinerated. The support housing defines at least one inlet port and at least one outlet port. A bed of acid neutralizing particles comprising primarily calcium carbonate is contained in the support housing between the inlet port and the outlet port. A bypass particulate filter is arranged in fluid series between the bed of acid neutralizing particles and the at least one outlet port. The bypass particulate filter is sized substantially smaller than the full flow particulate filter. An annular seal is arranged externally on the support housing separating the at least one inlet port and the at least one outlet port for preventing oil from short circuiting the bed of acid neutralizing particles.

Other aspects, objectives and advantages of the invention will become more apparent from the following detailed description when taken in conjunction with the accompanying drawings.

BRIEF DESCRIPTION OF THE DRAWINGS

FIGS. 7 and 8 are end and cross section views of the filter cartridge shown in FIG. 1.

DETAILED DESCRIPTION OF THE INVENTION

Figure 1:
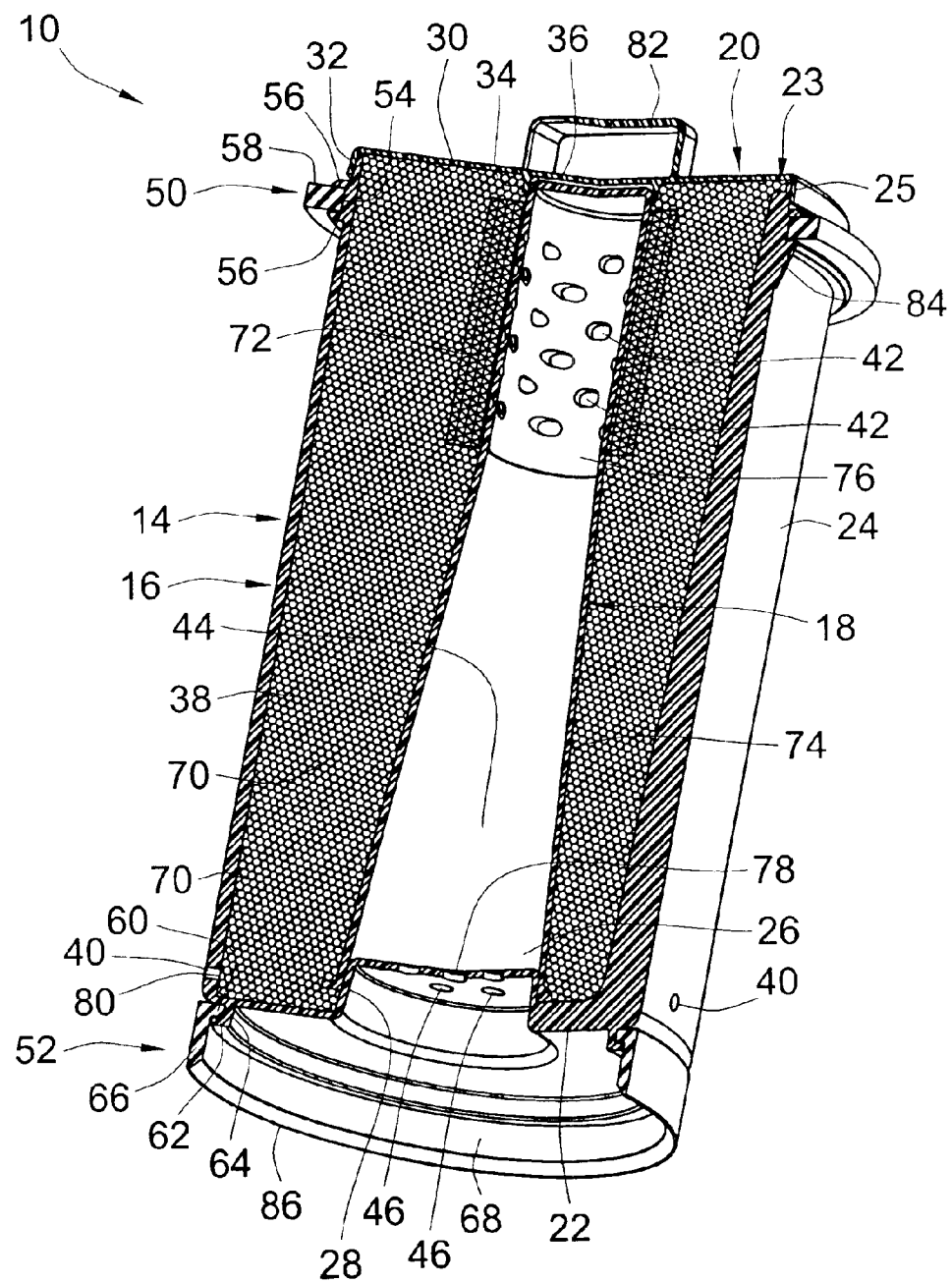
FIG. 1 is a cutaway isometric view of an environmentally friendly acid neutralizing bypass filter cartridge in accordance with an embodiment of the present invention.
Figure 2:
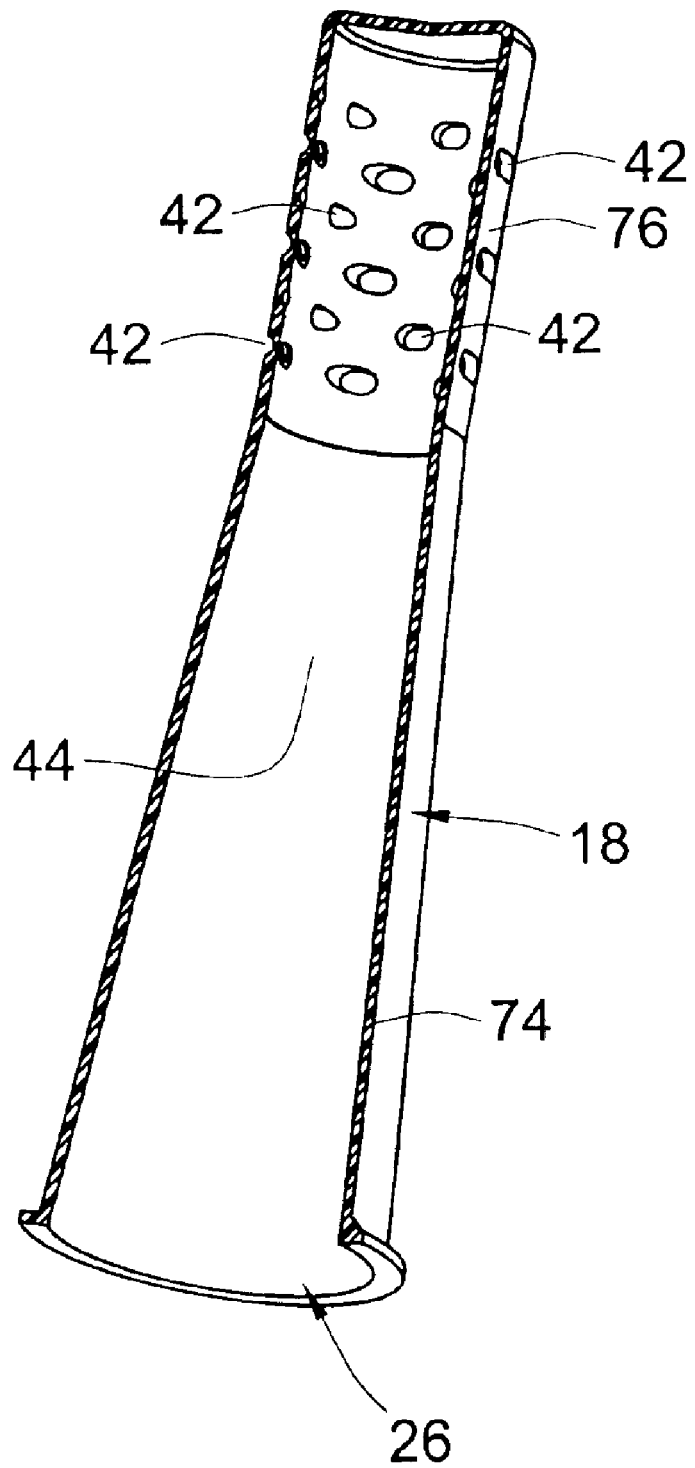
FIG. 2 is a cutaway isometric view of a center tube component used in the filter cartridge shown in FIG. 1.
Figure 3:
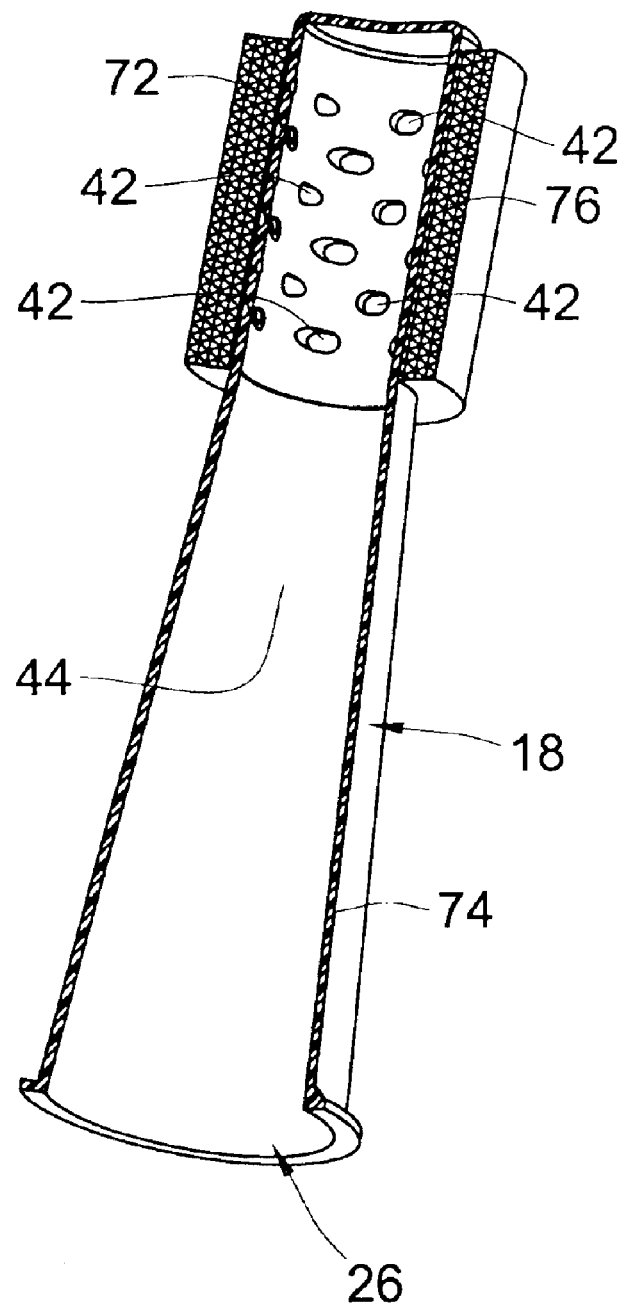
FIG. 3 is a cutaway isometric view of the center tube shown in FIG. 2 in combination with a bypass filter element.
Figure 10:
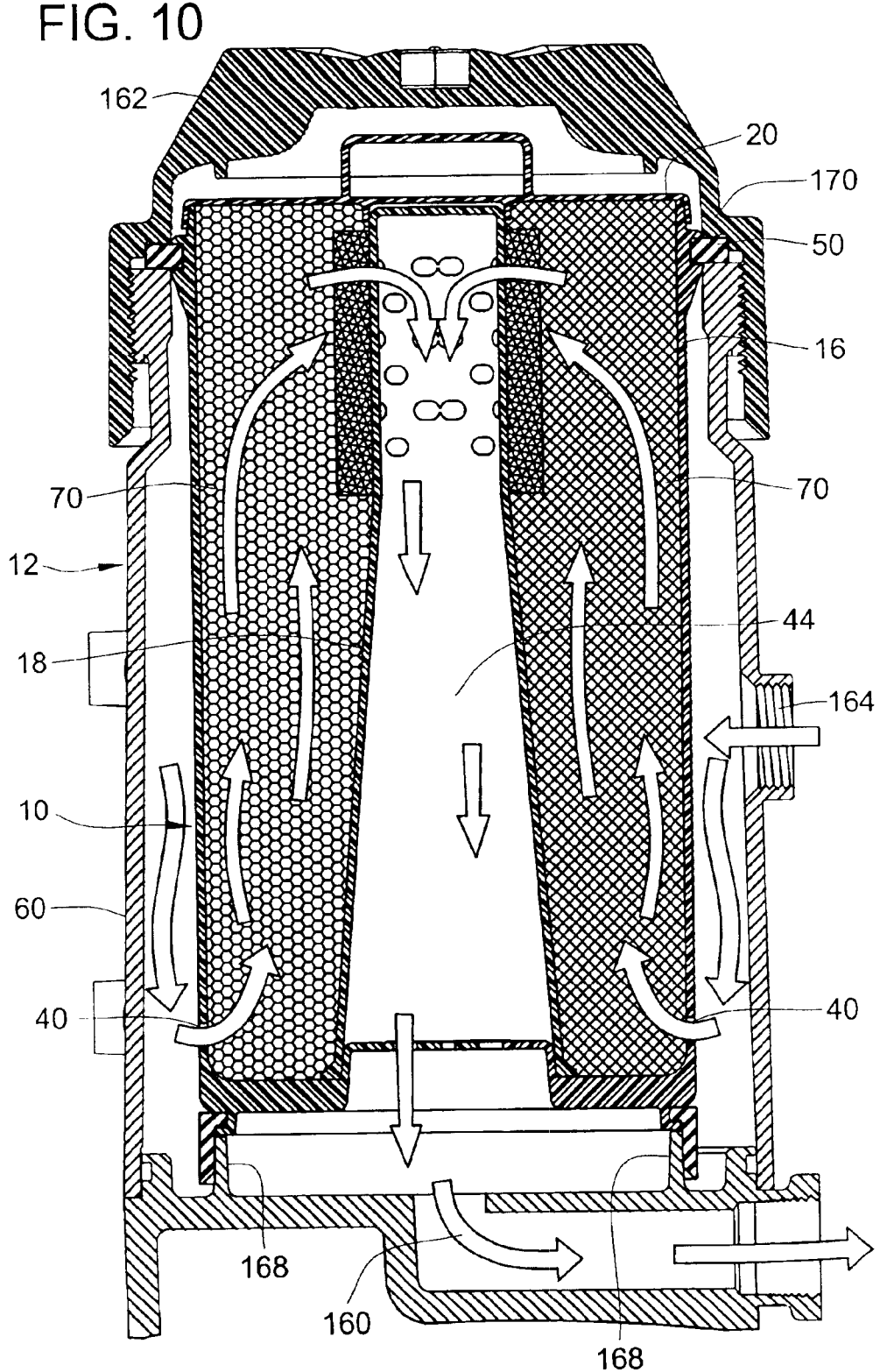
FIG. 10 is a cross section view of the filter cartridge similar to FIG. 8, but with the filter cartridge installed in a cartridge mounting body.

Referring to FIG. 1, an environmentally friendly acid neutralizing bypass filter cartridge 10 is illustrated in accordance with a preferred embodiment of the present invention. As shown in FIG. 10, the bypass filter cartridge 10 is adapted to be removably installed into a basin of a cartridge mounting body 12 along an engine oil bypass circuit. At selected maintenance intervals, the filter cartridge 10 will be pulled from the mounting body 12, disposed of (preferably through incineration) and replaced with a new filter cartridge.

One significant feature of the present invention is that it is environmentally friendly in that the entire support housing 14 of the filter cartridge 10 is built without or substantially without any metal parts such that the support housing 14 and the filter cartridge 10 can be incinerated rather than disposed of in a less environmentally friendly manner. The support housing 14 is that structure which generally defines the shape and provides for filtration and/or reaction chambers and defines predetermined flow paths through the filter cartridge 10. In the preferred embodiment, the support housing 14 is built from three structural components including an outer plastic molded bowl 16, a plastic molded center tube 18 and a plastic molded lid 20. These components provide the principle structural integrity to the cartridge 10. Strength enhancing features may be molded into these components such as axial ribs 21 (FIG. 4) molded into the bowl 16 to better ensure structural integrity.

The bowl 16 includes a plate shaped end wall 22 and a generally cylindrical or tubular sidewall 24 integrally connected thereto and projecting axially therefrom. The center tube 18 provides an inner annular wall that is arranged concentrically within the outer annular side wall 24. The center tube 18 includes an open end 26 that is slid over an axially projecting generally cylindrical or slightly conical plateau portion 28 integrally defined by the end wall 22 of the bowl 16. The plastic lid 20 is mounted to the free end 25 of the side wall 24 and thereby encloses the opening 23 at the top end of the filter cartridge 10. The lid 20 includes a cover portion 30 that rests upon the free end 25 and an outer skirt portion 32 that surrounds the outer periphery of the side wall 24. In addition, the lid 20 includes a concentrically configured inner skirt portion 34 that defines an internal cylindrical pocket 36 that receives the top end of the center tube 18, which may be plate shaped as shown.

To secure the support housing 14 together, the plastic to plastic interfaces between the lid, the center tube, and the bowl are either chemically or mechanically secured together by such means as known plastic welding techniques, or by press fitting, snap fitting, gluing, bonding techniques, or other appropriate plastic to plastic securing mechanisms.

With the above construction, the support housing 14 includes an outer annular wall provided by the side wall 24, an inner annular wall provided by the center tube 18, and opposed capped end walls provided by the lid 20 and the integral end wall 22. Between the outer side wall 24 and the inner center tube 18 is defined an annular reactant chamber 38. To facilitate flow into and out of the reactant chamber 38, the support housing 14 includes at least one inlet port provided by a plurality of inlet holes 40 which are formed into the side wall 24 and at least one chamber exit port shown as a plurality of radial through ports 42 defined by the center tube 18. The center tube 18 defines an axial passageway that connects the through ports 42 to at least one outlet port provided by a plurality of outlet holes 46 defined through the raised plateau portion 28 of the bowl end wall 22. With this porting arrangement, a predetermined flow path is defined through the filter cartridge that extends in sequence through the inlet holes 40 through the annular reactant chamber 38, through the radial through port 42 down the internal axial passage 44 of the center tube and through the outlet holes 46.

To ensure that oil does not short circuit the filter cartridge 10, a bottom gasket 52 is provided at the bottom end of the filter cartridge. A top gasket 50 is also provided to prevent ingress of material and to keep the handle freer of oil material to thereby provide for cleaner maintenance.

The top gasket 50 is mounted in an annular groove 54 provided by a pair of radially outward projecting flange walls integrally provided by the plastic bowl 16 near the free end 25. This gasket 50 is configured as an axial seal and is adapted to form a seal along its upper surface along sealing edge 58. Fluid pressure from the outside periphery of the support housing applies upward axial pressure to this gasket 50 to press the sealing edge ring 58 into axial engagement for forming this seal.

The bottom gasket 52 is of the radially sealing type and includes an L-shaped configuration including a radially inward projecting flange 60 that is trapped in a retaining structure 62 that provides an annular mounting groove 64 at the bottom end of the filter cartridge. The bottom gasket 52 also includes an axially projecting annular sealing flange 66 that surrounds the outlet holes 46. The sealing flange 66 is adapted to be pressed radially inward by virtue of the higher pressure along the outside of the filter cartridge 10 than is experienced in a region upstream of the inlet holes 40 against a corresponding cylindrical sealing wall 170 (FIG. 10) of the cartridge mounting body 12 generally along radial sealing edge indicated at 68.

The reactant chamber 38 is filled with acid neutralizing particles primarily comprising calcium carbonate material which may be provided by crushed limestone particles 70, or other suitable yet inexpensive acid neutralizing medium to provide a commercially practical and inexpensive filter. The crushed limestone particles 70 provide a very inexpensive compound as it occurs naturally as readily available limestone (limestone technically is a naturally occurring substance that primarily comprises calcium carbonate but may also include magnesium carbonate and other trace minerals or materials). The limestone particles 70 are crushed to be fine enough to provide a large surface area for calcium carbonate molecules to interact with acid molecules in the oil while at the same time not being too fine so as to impede, block or prevent flow of oil through the reactor support housing 14. As oil flows through the reactor housing, acid molecules contained within the oil will come into contact with the outer surface of the limestone particles, will react with calcium carbonate contained therein and thereby cause a reaction to take place in which the acid molecule is neutralized. This effectively reduces the amount of acid molecules in the oil thereby reducing the corrosion wear on the bearings and other similar metal surfaces of the engine, and thereby also can provide for a prolonged maintenance service interval for an oil change.

In addition, a means is provided to prevent the crushed limestone particles and fines contained therein from entering the oil system of the engine. One such means provided herein is a bypass particulate filter element 72 that is arranged in fluid series between the bed of crushed limestone particles 70 and the outlet holes 46 such that the bypass particulate filter element is arranged to filter out limestone particles or fines contained therein and prevent exit from the filter cartridge during use. As shown herein, the bypass particulate filter element may be arranged within the annular reactant chamber 38 covering the through ports 42. The bypass filter element 72 may comprise a relatively fine felt-type material having a porosity smaller than that of the crushed limestone particles 70 or fines contained therein and may only extend part of the axial length of the filter and annular reactant chamber 38 as is shown sufficient to cover the radial through ports 42. Alternatively, the bypass filter element 72 can be of a conventional pleat-type media or can also be a conventional depth filtration tube.

The filter element 72 preferably extends only a small portion of the axial distance of the reactant chamber to provide more room for acid neutralizing particles and a longer oil flow path through the reactor housing. However, if more filtration is desired, the bypass filter element 72 can extend the axial length of reactant chamber 38. However, an advantage of the preferred embodiment of the present invention is that the filter cartridge 10 is configured and designed as a replaceable filter cartridge in a bypass system such that the bypass particulate filter element 72 is not designed as a full flow filter but is designed as a bypass filter to ensure that particles of reactant media do not enter the oil circuit. Thus, the bypass filter element 72 is designed to be substantially smaller than the full flow filter as will be later described with reference to FIG. 9. With a relatively small filter element 72 being provided, there is a large amount of void space within the annular reactant chamber 38 which is filled with suitable acid neutralizing media such as the crushed limestone particles 70. By shortening the bypass filter element 72 such that it only extends part of the axial length of the center tube 18 there is even more room available for the crushed limestone particles 70 and the overall cost of providing the filter cartridge 10 is reduced due to the fact that filter element material typically costs substantially more than acid neutralizing media such as crushed limestone particles 70. An added feature/benefit of teh shortened bypass filter element is that the oil must flow a substantial axial distance through the annular reactant chamber 38. The longer distance through the acid neutralizing media the oil must flow increases the oils interactions with the acid neutralizing media, therefore increasing the acid neutralizing power of the filter cartridge 10.

To provide for retention of the partial length bypass filter element 72 which is shown, the center tube 18 includes a retention structure shown herein as a conical proportion 74 of the center tube that is of a larger outer diameter than a cylindrical portion 76 of the center tube 18 which provides the through ports which are covered by the tubular filter element 72. The filter element 72 may be glued or otherwise adhered to the center tube 18.

An alternative or supplemental means for preventing crushed limestone particles or fines therein from exiting the outlet holes 46 is that fine mesh material 78 may be provided that is preferably insert molded directly into and over the plastic material that defines the outlet holes 46. Thus, the mesh material 78 in the disclosed embodiment provides as a backup for the tubular filter element 72. Such mesh material may also be provided and integrally insert molded over the through ports 42 of the center tube 18 if desired.

Additionally, mesh material 80 is preferable provided over the inlet holes 40 to prevent escape of crushed limestone particles 70 from the filter cartridge 10 during installation or otherwise. The mesh material 80 is preferably insert molded integrally into the plastic material of the bowl side wall 24 over the inlet holes 40.

An additional feature of the present invention is the inclusion of a handle 82 that is integrally molded to the top end of the lid 20 to facilitate insertion and removal of the filter cartridge 10 into the cartridge mounting body 12. The top gasket 50 at the upper end of the filter cartridge is designed to prevent the ingress of foreign materials and also to keep the handle relatively clean and free of oil to provide for cleaner removal and insertion during maintenance.

A further feature of the present invention is that beveled or triangular guide ribs 84 may be integrally provided along the outer periphery of the side wall 24 projecting downward from the bottom flange groove wall 56. The angled guide ribs 84 facilitate easier insertion of the filter cartridge 10 into a cartridge mounting body 12 and guide the first upper gasket 50 into correct concentric alignment.

At the bottom end of the cartridge, the bottom edge of the bottom gasket 52 is provided with a conical guide edge 86 that is adapted to engage its cylindrical sealing lip of the cartridge mounting body basin (FIG. 10) such that a second gasket expands outwardly over the sealing lip into proper concentric arrangement over the cylindrical sealing lip.

Figure 4:
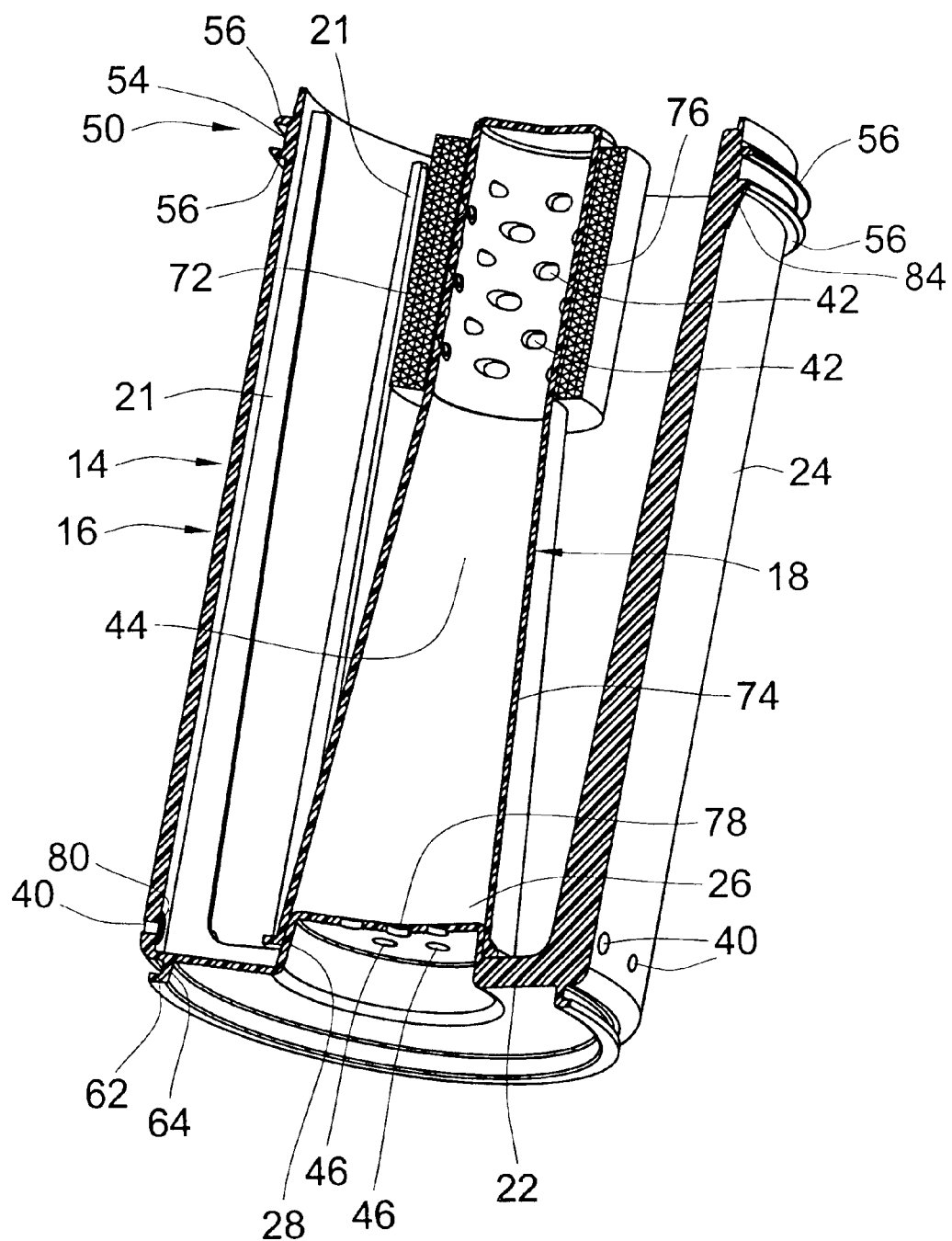
FIG. 4 is a cutaway isometric view of the center tube and bypass filter element installed in a plastic bowl member performing the filter cartridge.
Figure 5:
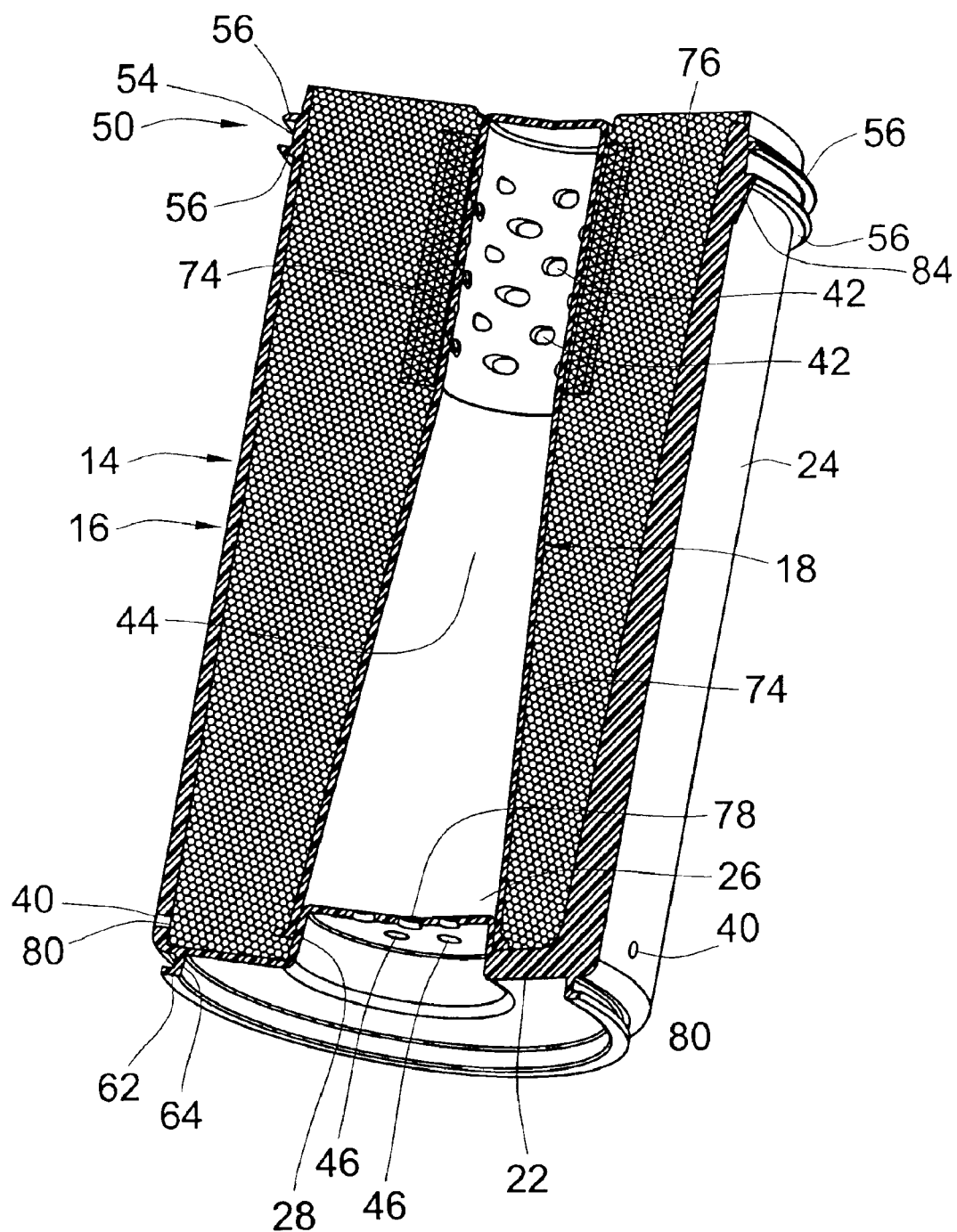
FIG. 5 is a view similar to FIG. 4 but with the bowl filled with acid neutralizing reactant medium.
Figure 6:
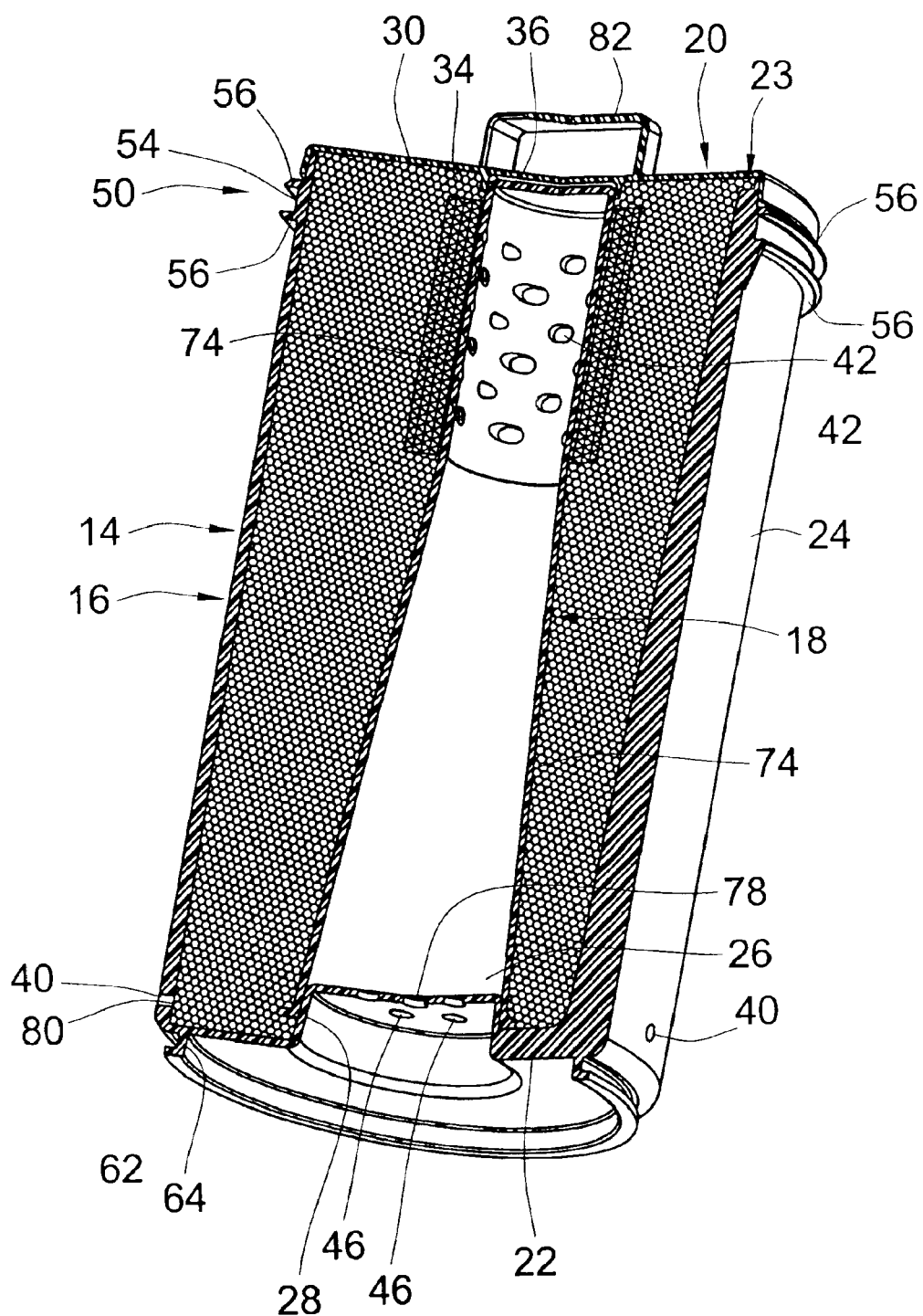
FIG. 6 is a view similar to FIG. 5 but with a plastic lid installed on the plastic bowl and the center tube.

The assembly of the filter cartridge can be seen in the illustrations generally by following in sequence FIGS. 2–6 (and then FIG. 1 which is the assembled filter cartridge 10). The assembly of a filter cartridge starts with the center tube 18. A cylindrical bypass particulate filter element 72 is mechanically or chemically adhered to the center tube 18 in a region around the through ports 42 to provide a seal between the two. The center tube 18 with the bypass filter elements 72 is then assembled into the reactor bowl 16 by either mechanically or chemically welding the components again to provide a seal as is shown in FIG. 4. The reactor bowl 16 is then ready to be filled with the reactant as is shown in FIG. 5. A typical reactant that is filled into the cylindrical bowl is calcium carbonate particles which can readily be provided by naturally occurring crushed limestone material which is filled and compacted into the reactor bowl 16 as shown in FIG. 5. Thereafter, the plastic lid 18 with an integral handle 82 is installed and welded to the free end of the reactor bowl 16 either mechanically or chemically. Thereafter, the seals 50 and 52 are installed into their corresponding grooves 54, 64. If necessary, vertical grooves (not shown) through the lid gasket revolve protrusion (flange walls 56) or a vent port (not shown) through the lid 18 may be provided for pressure equalization on both sides of the lid gasket 50 and the lid 18.

Figure 9:
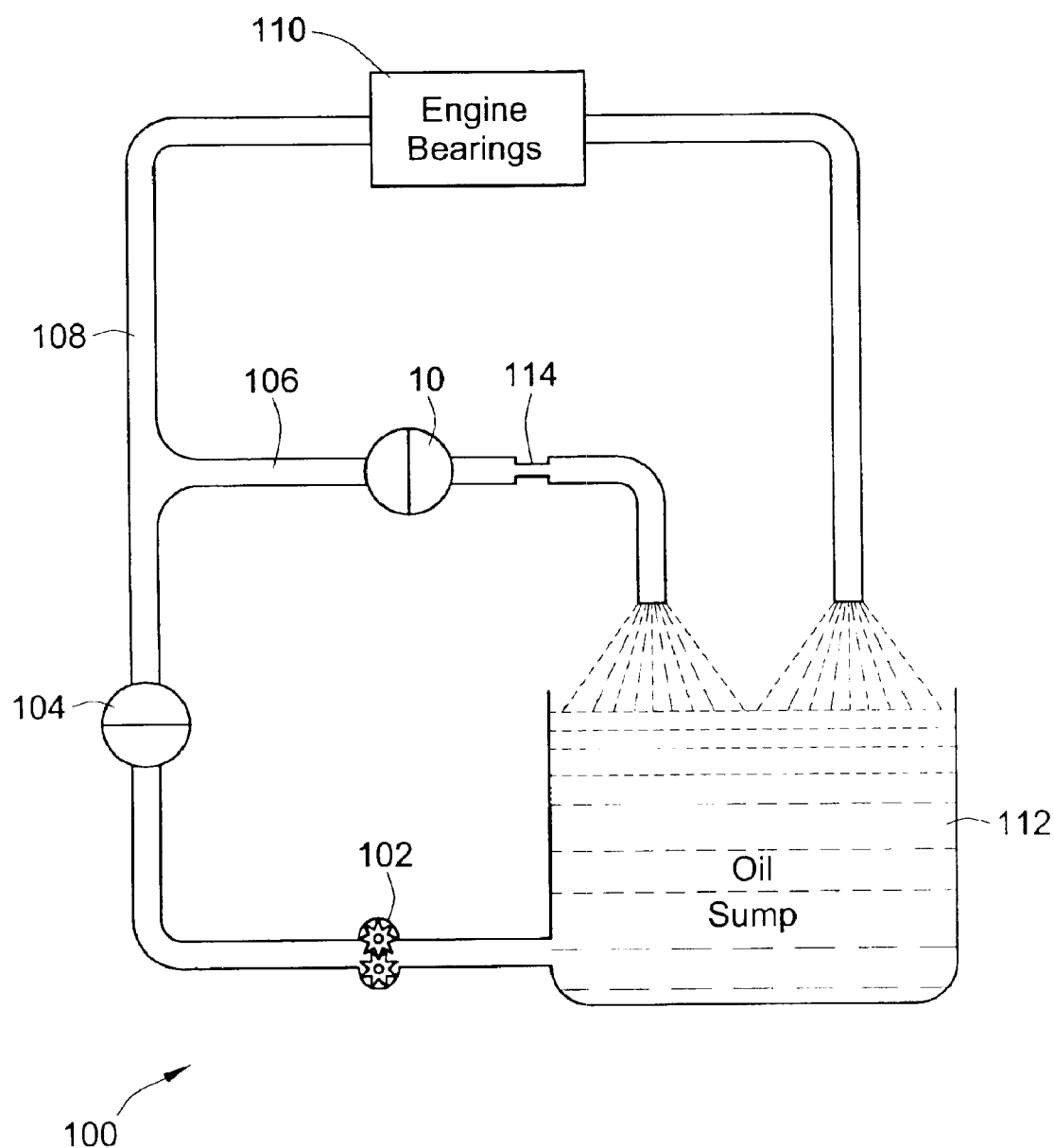
FIG. 9 is schematic representation of a full flow and bypass circuit of an engine showing the environmentally bypass filter cartridge of the present invention incorporated thereon in accordance with an embodiment of the present invention.

As noted above, a preferred embodiment of the present invention is in the form of a bypass filter 10 for an engine oil circuit 100 which is schematically indicated in FIG. 9. This oil circuit 100 includes an oil pump 102 that pumps oil along a passage first through a full flow filter 104 that passes oil pumped by oil pump 102. Thereafter, there is a split in the circuit and the oil can either pass through the bypass line 106 or a primary oil line 108. With all of the oil that is jetted toward the bearings 110 through the primary oil line 108 passing through the full flow particulate filter 104, undesirable particulates (sized greater than the porosity of the full flow filter) are removed by the full flow particulate filter 104 prior to reaching the bearings 110, hence the term "full flow" (the bearings 110 represent and are meant to include the metal to metal sliding surfaces as is described in the background section). During engine operation it is critical to have the bearing surfaces 110 continuously lubricated via oil to provide a thin film that effectively substantially prevents metal to metal contact thereby preventing wear. Therefore, substantially all of the oil passing through the full flow particulate filter is routed through the primary oil line 108 and through the bearings 110 where thereafter eventually returns to the oil pan or sump 112. However, a small portion of the oil is routed along the bypass line 106 and passed through the bypass filter 10 of the present invention. A restriction orifice 114 which may be roughly about 0.105" in diameter strictly limits the amount of oil passing along the bypass line 106. During regular operation, about 10% of the total flow passing through the full flow filter 104 passes through the bypass filter cartridge 10 (but it may be designed to be anywhere between roughly 5% and 20% for normal engine operation). Importantly, not too much oil is passed through the bypass line 106, otherwise, when oil pressure drops when the engine is idling, insufficient pressure may not be available to supply sufficient oil to the bearings 110 of the engine. This is because the restriction orifice 114 stays the same despite less oil being pumped.

Also a critical aspect of the present invention is that not all oil pumped by the oil pump 102 is passed through the bed of limestone particles 70 by virtue of the bypass filter cartridge 10 being mounted in the bypass line 106 rather than the primary oil line 108 or where the full flow particulate filter 104 is located. The importance of this is that there is the possibility that the relatively fine crushed particle size of the limestone particles 70 could become clogged either through compaction, sludge forming and being retained within the limestone particle bed, a combination of these factors or otherwise. Simply put, the inventors of the present invention have determined that it is too much of a risk to consider placing the limestone bed along the full flow filter path as there would be an increase potential for plugging the oil circuit and thereby preventing the critical oil flow to the bearings 110. By placing the bed of crushed limestone particles 70 on the bypass line, the limestone particles can be crushed to be significantly smaller and thereby provide much more acid reacting surface area than could otherwise be obtained along the primary flow path to the bearings 110. As a result, the way the invention has been incorporated, the acids contained in the oil are systematically removed by a small portion of the oil containing such acids passing through the bypass line and bypass filter thereby reducing corrosion and wear of metal components. At the same time, by placing the bypass filter in parallel circuit with the bearings 110, there is not a chance that oil flow to the bearings will be plugged by virtue of the bed of relatively finely crushed limestone particles 70.

A further advantage of the present invention is that the bypass filter cartridge 10 can be made in a very economical fashion since the components to the bypass filter are made using in part conventional filter manufacturing technologies, very inexpensive acid neutralizing media which occurs naturally (e.g. limestone) which is anticipated to cost only a couple cents per filter at most, a very small bypass filter element that can also be inexpensive as a result of its very small size needed only to ensure that particles of limestone material do not enter the fluid circuit. The bypass filter element 72 can be sized to be substantially smaller and configured to pass substantially less oil than the full flow filter 104 which is schematically illustrated in FIG. 8. This also keeps the cost of the filter cartridge 10 to be sufficiently inexpensive to make it practical and economically for commercial applications while achieving acid neutralization and extended service intervals and/or reduced corrosive wear and extended engine life.

Referring to FIG. 10, an exemplary cartridge mounting body 12 for the filter cartridge 10 is illustrated. It is understood that the cartridge mounting body 12 is not part of the subject filter cartridge of the invention but is shown to illustrate how the filter cartridge 10 can be implemented according to a preferred embodiment. The cartridge mounting body 12 generally includes a cast metal bowl or basin 160 which receives the filter cartridge 10. The open end of the basin 160 is enclosed via a top end cover 162 that may be threadingly screwed on to the basin 160. The basin has an inlet passage 164 through its side and an outlet passage 166 centrally located along its bottom end. Surrounding the outlet passage 166 is a cylindrical wall 168 that projects upwardly for providing a structure that can be sealed against. The filter cartridge 10 is installed into the mounting body 12 by axially sliding the filter cartridge 10 into the basin 160 while the top end cover 162 is removed from the basin. As the filter cartridge 10 slides down into position, the conical cam surface 86 of the bottom end gasket 52 engages the top surface of the cylindrical wall 168 and deflects radially outwardly around the cylindrical wall 168 such that the sealing flange 66 comes into radial sealing interference contact with the cylindrical wall 168. While in this position, the sealing flange 66 separates the inlet side or inlet passage 164 from the outlet side or outlet passage 166. Because the inlet passage will typically provide a higher pressure than that experienced at the outlet passage due to a pressure drop experienced across the filter cartridge 10, the higher pressure along the inlet side will tend to press the sealing flange 66 into radial sealing engagement with the cylindrical wall 168 of the cartridge mounting body.

Another feature that helps guide insertion of the filter cartridge 10 is the provision of triangular protrusions or ribs 84 projecting radially outward near the top end positioned just below the bottom groove wall 56. The triangular protrusions or ribs 84 are angled such that facilitate and tend to center the filter cartridge when it is being inserted into the mounting basin 160. Once the filter cartridge 10 is installed, the top end cover 162 is screwed back onto the basin 160 which causes axial engagement between an annular shoulder portion 170 integrally defined by the top end cover 162. Again, the higher pressure experienced along the inlet side or the inlet passage 164 tends to exert an axial force on the top end gasket 50 to maintain it upward sealing engagement with the top end cover 162.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An acid neutralizing filter cartridge for mounting into a chamber of a cartridge mounting body for neutralizing acid in engine oil in an oil circulation circuit of an engine, comprising:
   a support housing, the support housing comprising opposed axially spaced ends and an axially extending tubular sidewall, said support housing further comprising at least one inlet port and at least one outlet port;
   a bed of acid neutralizing particles contained in the support housing between the inlet port and the outlet port;
   means for preventing acid neutralizing particles from flowing through the at least one outlet port; and
   a first annular seal arranged externally on the support housing separating the at least one inlet port and the at least one outlet port for preventing oil from short circuiting the bed of acid neutralizing particles and a second annular seal mounted on said axially extending tubular sidewall.

2. The acid neutralizing filter cartridge of claim 1, wherein said support housing includes a plastic bowl having an end wall and said tubular sidewall extending axially therefrom toward an open end, a plastic lid enclosing the open end and a plastic center tube extending axially between the end wall and the lid.

3. The acid neutralizing filter cartridge of claim 2, wherein the bed of acid neutralizing particles is contained between the tubular sidewall and the plastic center tube.

4. The acid neutralizing filter cartridge of claim 2, wherein the lid is integrally secured to the sidewall, and wherein opposed ends of the plastic center tube are integrally secured to the plastic lid and the end wall.

5. The acid neutralizing filter cartridge of claim 2, wherein the support housing consists of only three separately molded parts including the plastic bowl, the plastic center tube and the plastic lid.

6. The acid neutralizing filter cartridge of claim 2, wherein plastic bowl defines the at least one inlet port, wherein the center tube includes at least one through port and wherein the end wall includes defines the at least one outlet port, wherein the cartridge defines a predetermined flow path extending in sequence through the at least one inlet port, the bed of acid neutralizing particles, the through port, an internal passage defined by the center tube and the at least one outlet port.

7. The acid neutralizing filter cartridge of claim 6, wherein said preventing means comprises a tubular particulate filter surrounding the through port.

8. The acid neutralizing filter cartridge of claim 7, wherein said preventing means further comprises a mesh screen integrally molded into the housing interposed between the tubular particulate filter and the at least one outlet port.

9. The acid neutralizing filter cartridge of claim 6, wherein the at least one inlet port comprises a plurality of inlet holes formed into the plastic bowl proximate the end wall, and wherein the through ports are arranged in axial spaced relation relative to the inlet holes proximate the lid, such a winding flow path is defined through the bed that includes substantial axial and substantial radial components.

10. The acid neutralizing filter cartridge of claim 9, wherein the plastic center tube includes a generally cylindrical portion and a generally conical portion.

11. The acid neutralizing filter cartridge of claim 9, further comprising said second annular seal in axial spaced relation to said first annular seal, the inlet holes being defined between the first and second annular seal, wherein the second annular seal has a radially outward projecting sealing flange providing an axial seal, and wherein the first annular seal has an axially projecting sealing flange adapted to be pressed radially inward against the mounting body via high pressure experienced at the at least one inlet port to provide a radial seal.

12. The acid neutralizing filter cartridge of claim 11, wherein the plastic bowl defines first and second grooves retaining the first and second annular seals.

13. The acid neutralizing filter cartridge of claim 11, wherein the first annular seal includes a conical cam face aligned to deflect the first annular seal radially outwardly when engaged.

14. The acid neutralizing filter cartridge of claim 2, wherein the lid integrally provides a pull handle.

15. The acid neutralizing filter cartridge of claim 1, wherein the support housing comprises plastic molded parts defining said at least one inlet port and said at least one outlet port, wherein said preventing means includes a mesh screen intregally molded into at least one of the molded parts downstream of the bed of acid neutralizing particles.

16. The acid neutralizing filter cartridge of claim 1, wherein the preventing means comprises a particulate filter.

17. The acid neutralizing filter cartridge of claim 16, wherein said particulate filter is sized as a bypass filter and is substantially smaller than a particulate filter of a full pass filter which filters particulates from oil in a fluid circuit for the engine.

18. The acid neutralizing filter cartridge of claim 1, wherein the acid neutralizing particles comprises primarily calcium carbonate.

19. The acid neutralizing filter cartridge of claim 18, wherein the acid neutralizing particles comprise crushed limestone.

20. The acid neutralizing filter cartridge of claim 12, wherein the first annular groove is defined between first and second annular walls, further comprising chamfered guide ribs projecting axially from one of said annular walls configured to guide insertion of the filter cartridge into the cartridge mounting body.

21. An environmentally friendly acid neutralizing filter cartridge for mounting into a chamber of a cartridge mounting body having an inlet and an outlet body for neutralizing acid in engine oil along a bypass oil circuit of a oil circulation circuit of an engine, the bypass oil circuit being arranged and restricted so as pass a substantially smaller amount of oil that that being circulated to the engine bearings, the oil circulation circuit including a full flow particulate filter in series with the engine bearings, the filter cartridge comprising:
   a support housing having opposed ends and an axially extending tubular sidewall, said support housing being adapted to being mounting in the cartridge mounting body, the support housing comprising substantially no metal parts such that the support housing can be incinerated, the support housing comprising at least one inlet port and at least one outlet port;
   a bed of acid neutralizing particles comprising primarily calcium carbonate contained in the support housing between the inlet port and the outlet port;

a particulate filter arranged in fluid series between the bed of acid neutralizing particles and the at least one outlet port, the particulate filter being sized substantially smaller than the full flow particulate filter;

an annular seal arranged externally on the support housing separating the at least one inlet port and the at least one outlet port for preventing oil from short circuiting the bed of acid neutralizing particles; and further comprising a second annular seal externally mounted on the support housing on said axially extending tubular sidewall in axial spaced relation to said first annular seal, the at least one inlet port being defined between the first and second annular seals.

22. The environmentally friendly acid neutralizing filter cartridge of claim 21, wherein the support housing comprises a plurality of parts molded of plastic material assembled together to form an outer tubular wall, an inner tubular wall, first end wall and a second end wall, the outer and inner tubular walls extending axially between the first and second walls, the inner tubular wall defining at least one through port and an axial passage connecting the at least one through port with the at least one outlet port.

23. The environmentally friendly acid neutralizing filter cartridge of claim 22, wherein a predetermined flow path is defined in the filter cartridge that extends in sequence through the at least one inlet port, an annular chamber between the inner and outer tubular walls, the at least one through port, the axial passage and the at least one outlet port.

24. The environmentally friendly acid neutralizing filter cartridge of claim 23, wherein the at least one inlet port and the at least one through port are radially spaced and axially spaced proximate opposed ends of the filter cartridge thereby imparting substantial radial and axial components on a portion of the predetermined flow path through the annular chamber.

25. The environmentally friendly acid neutralizing filter cartridge of claim 24, wherein the bed of acid neutralizing particles are contained in the annular chamber.

26. The environmentally friendly acid neutralizing filter cartridge of claim 24, wherein the particulate filter surrounds the inner tubular wall in fluid series between the bed of acid neutralizing particles and the at least one through port.

27. The environmentally friendly acid neutralizing filter cartridge of claim 21, further comprising mesh screen material integrally molded over the at least one inlet port.

28. The environmentally friendly acid neutralizing filter cartridge of claim 21, further comprising mesh screen material integrally molded over the at least one outlet port.

29. The environmentally friendly acid neutralizing filter cartridge of claim 21, wherein said support housing includes a plastic bowl having an end wall and a tubular sidewall extending axially therefrom toward an open end, a plastic lid enclosing the open end and a plastic center tube extending axially between the end wall and the lid.

30. The environmentally friendly acid neutralizing filter cartridge of claim 29, wherein the support housing consists of only three separately molded parts including the plastic bowl, the plastic center tube and the plastic lid.

31. The acid neutralizing filter cartridge of claim 1, wherein said second annular seal is externally arranged on the support housing in axial spaced relation to said first annular seal, at least one inlet port being defined along the outer annular periphery between the first and second seals.

* * * * *

UNITED STATES PATENT AND TRADEMARK OFFICE
CERTIFICATE OF CORRECTION

PATENT NO. : 7,232,521 B2  Page 1 of 1
APPLICATION NO. : 10/457239
DATED : June 19, 2007
INVENTOR(S) : Merritt et al.

It is certified that error appears in the above-identified patent and that said Letters Patent is hereby corrected as shown below:

On the Title Page:

Col. 2, under FOREIGN PATENT DOCUMENTS: "GB 504064" should read --GB 507064--.

Signed and Sealed this

Fifteenth Day of April, 2008

JON W. DUDAS
*Director of the United States Patent and Trademark Office*